United States Patent [19]
Freiburger

[11] 3,763,949
[45] Oct. 9, 1973

[54] ARTICULATED VEHICLE TRANSMISSION ASSEMBLY

[75] Inventor: Thomas William Freiburger, Dubuque, Iowa

[73] Assignee: Deere & Company, Moline, Ill.

[22] Filed: Sept. 11, 1972

[21] Appl. No.: 288,190

[52] U.S. Cl. .................... 180/51, 74/15.2, 180/53
[51] Int. Cl. ........................................... B60k 17/34
[58] Field of Search .................... 180/14 R, 51, 53; 74/15.2, 761, 767, 769

[56] References Cited
UNITED STATES PATENTS

| | | | |
|---|---|---|---|
| 3,253,671 | 5/1966 | Fielding | 180/51 |
| 3,298,252 | 1/1967 | Harris et al. | 74/767 X |
| 3,701,393 | 10/1972 | Lemons et al. | 180/51 |

Primary Examiner—M. Henson Wood, Jr.
Assistant Examiner—Michael Mar
Attorney—H. Vincent Harsha et al.

[57] ABSTRACT

An articulated skidder tractor includes front and rear frame sections respectively on which are mounted a transmission and a logging winch. The transmission includes traction and winch drive shafts which extend through the hinge area of the tractor along axes which intersect the hinge axis and are located along the tractor fore-and-aft centerline. The traction wheel drive shaft is driven through a gear train including an idler gear which is meshed with a driven gear fixed to the traction wheel drive shaft. The winch drive shaft extends axially through and is loosely received within the idler gear. The winch drive shaft is driven through a gear train including a countershaft having a pinion gear fixed thereto and meshed with a driven gear carried by the winch drive shaft. A pump is located within the transmission housing and includes a drive shaft which carries a gear that is also meshed with the pinion gear carried by the drive shaft. The pump housing has one end which extends through and is fixed by exteriorly located screws to the rear end of the transmission housing thus permitting servicing of the pump from the hinge area of the tractor.

10 Claims, 5 Drawing Figures

ARTICULATED VEHICLE TRANSMISSION ASSEMBLY

BACKGROUND OF THE INVENTION

The present invention relates to a transmission assembly and more specifically relates to a transmission assembly particularly adapted for use in an articulated vehicle of the type including front and rear pivotally interconnected frame sections with the transmission being located on the front section and with a pair of driven ground wheels and at least one power take-off driven auxiliary device being located at the rear section.

In articulated vehicles of the aforementioned type, it is the usual design practice to provide separate transmission drive shafts for respectively driving the driven ground wheels and the auxiliary device located at the rear frame section and to place these drive shafts on the fore-and-aft centerline of the tractor such that their axes of rotation intersect the vertical pivot axis defined by the connection between the front and rear frame sections.

It is further common design practice to keep the center of gravity of a vehicle as low as possible to improve its stability; however, in the case of articulated vehicles such as skidders and the like, adequate clearance must be provided beneath the vehicle chassis in order that the vehicle may be used over terrain whereat fallen logs and rocks and the like are located. Also, in order to increase the vehicle's maneuverability in the forest among a close stand of trees or in other conditions wherein the vehicle must pass between closely spaced objects, it is necessary to keep the width of the vehicle within certain limits.

Because the transmission constitutes a large portion of the mass of the vehicle, it is desirable to keep the transmission components as low in the vehicle as is practical without compromising the other design objectives of keeping the output shafts of the transmission on the centerline of the tractor, of providing adequate clearance beneath the tractor and of making the tractor sufficiently narrow. Heretofore, certain transmission designs have not been as compact as would be desirable from the standpoint of lowering the center of gravity of the vehicles.

SUMMARY OF THE INVENTION

Accordingly, the principal object of the present invention is to provide a transmission assembly for an articulated vehicle, the assembly being relatively compact in the vertical direction. A more specific object is to provide a transmission having a traction wheel drive shaft which is located relatively low in the vehicle and which is driven from an output shaft of the transmission speed section through the intermediary of an idler gear and wherein a winch drive shaft extends axially through the idler gear.

It is a further object to provide a transmission having a pump located internally of the transmission housing, the pump including a drive shaft having a driven gear fixed thereto which is driven by means of a pinion gear fixed to a countershaft, the pinion gear also driving a driven gear fixed to the winch drive shaft.

Still another object is to provide a transmission having such an internally located pump which has a housing mounted in the rear wall of the transmission housing at a level only slightly higher than the winch drive shaft and adjacent to one side of the transmission housing, the pump housing having an exposed rear end located exteriorly of and releasably secured to the transmission housing, the pump housing thus being easily accessible through the hinge area of the vehicle for removing the pump from the tractor transmission for servicing the same.

Yet another object is to provide the aforedescribed pump housing with a removable sealing cap also accessible at the hinge area, the cap providing easy access to one end of the pump drive shaft whereby an auxiliary pump may be attached thereto if desired.

These and other objects will become apparent from the following description and the appended drawing.

DESCRIPTION OF THE PREFERRED EMBODIMENT

Figure 1:
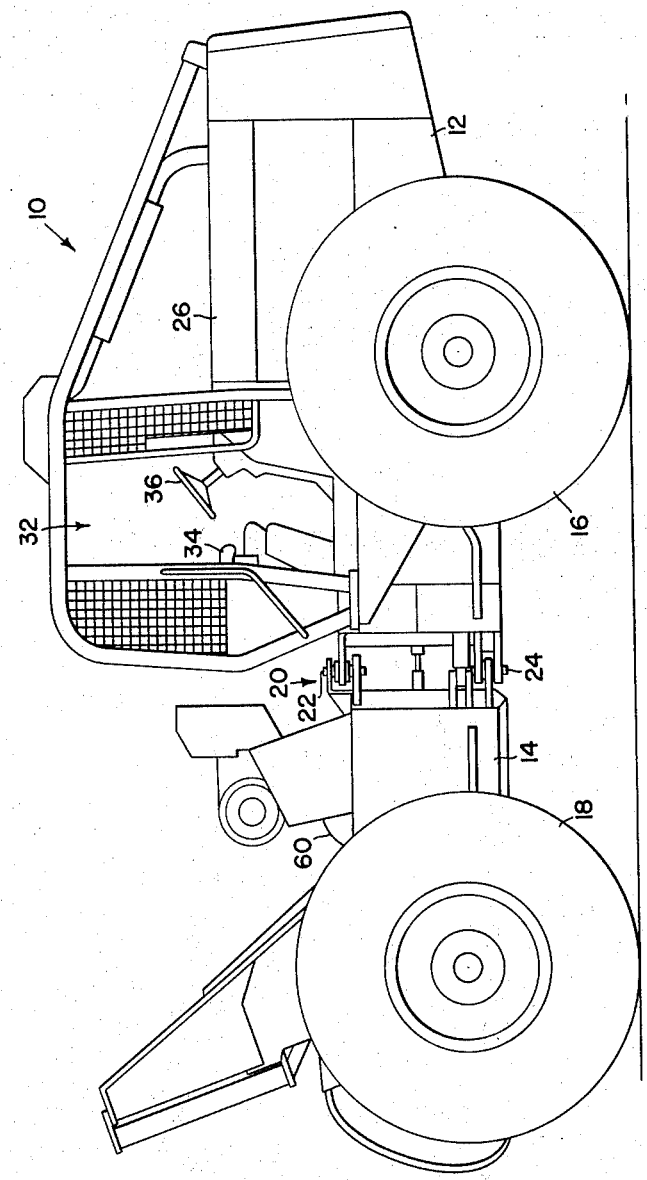
FIG. 1 is a side view of an articulated vehicle of the type with which the transmission assembly of the present invention is particularly adapted for use.

Referring now to FIG. 1, therein is shown a skidder tractor which is representative of the articulated vehicles with which the transmission assembly of the present invention is particularly adapted for use, the tractor being indicated in its entirety by the reference numeral 10. The tractor 10 includes front and rear frame sections 12 and 14, respectively, which are respectively mounted on front and rear pairs of driven traction wheels 16 and 18 (only one of each pair being shown). The front and rear frame sections are pivotally interconnected by means of a pivot assembly 20 including upper and lower vertically spaced axially aligned pivot pins 22 and 24 which define a vertical hinge or pivot axes.

Located on the forward frame section 12 is an engine (not shown) which is housed within a compartment 26 and which is drivingly connected to a transmission 28 at an input shaft 30. The transmission 28 is located in the lower part of the frame 12 below an operator's station 32 whereat a seat 34 and a steering wheel 36 are located along with other tractor controls (not shown) such as the shift levers for the transmission 28.

Figure 2:
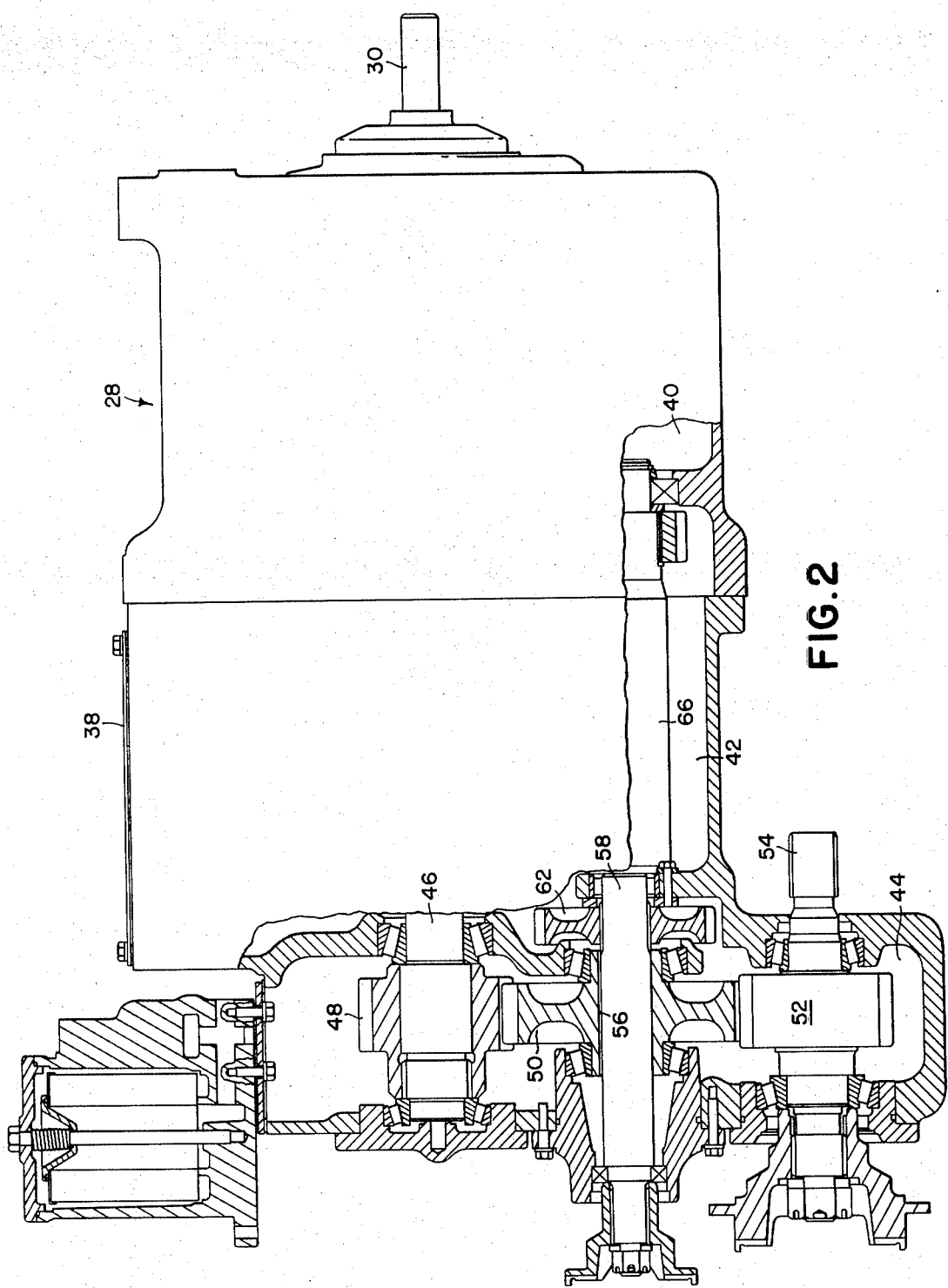
FIG. 2 is a side view partially in section of the transmission assembly of the present invention.
Figure 3:
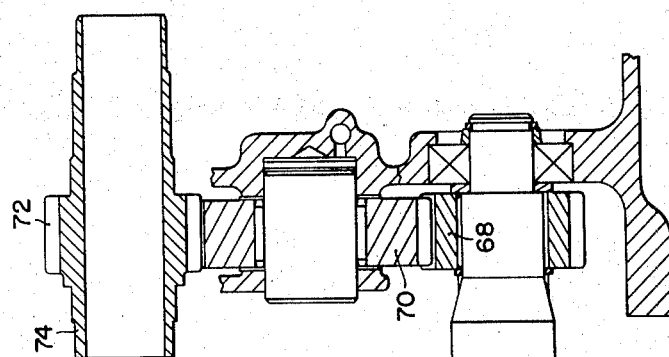
FIG. 3 is a diagrammatic rear end view of the transmission showing only certain ones of the transmission shafts and gearing.
Figure 4:
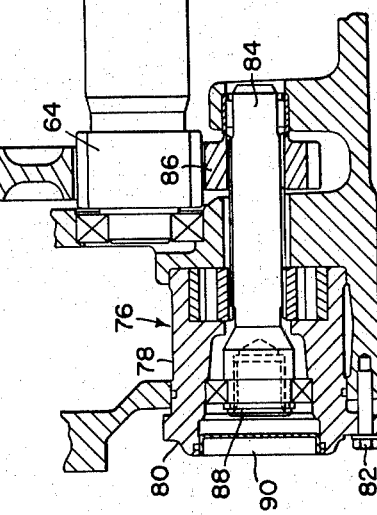
FIG. 4 is a view showing the rear end of the transmission and showing the transmission disposition relative to the tractor hinge assembly when the rear frame section is angled relative to the fore-and-aft centerline of the front frame section.

Referring now to FIGS. 2–4, it can be seen that the transmission includes a housing 38 divided into forward, intermediate and rearward compartments 40, 42 and 44, respectively, the forward and intermediate compartments respectively containing a forward range speed transmission section including the main traction clutch and an intermediate speed-change transmission section, both not shown. The forward and intermediate transmission sections are quite similar to those on the transmission described in U.S. Pat. No. 3,298,252 issued to Harris et al. on 17 Jan. 1967 and reference may be had to this patent for the details of the transmission sections if desired. The transmission of the present invention differs from that of the Harris et al. disclosure in that the power take-off shaft (to be described below) of the present invention is constantly driven at engine speed instead of being selectively engageable as is the case in the Harris et al. disclosure.

Located in the rearward transmission housing compartment 44 are the terminal or output drive shafts of the transmission. Specifically, axially aligned with the transmission input shaft 30 is an output shaft 46 of the intermediate speed-change transmission section, the shaft 46 having a pinion gear 48 secured thereto and meshed with an idler gear 50 having a central hub portion rotatably mounted in the opposite end walls of the compartment 44 and which is in turn meshed with a driven gear 52 fixed to a traction wheel drive shaft 54 which is located on the fore-and-aft centerline of the tractor 10 and intersects the vertical hinge axis defined by the hinge assembly 20. Located axially in the idler gear 50 is a cylindrical opening 56 in which is received an auxiliary equipment drive shaft 58 having its opposite ends rotatably supported in the front and rear walls of the compartment 44. The drive shaft 58 is here used to drive a winch 60 mounted centrally on the forward end portion of the rear frame section 14, the drive shaft 58 hereinafter may be referred to as the winch drive shaft. It is here to be noted that the winch drive shaft 58 is also located on the tractor centerline and intersects the vertical pivot axis defined by the pivot assembly 20.

As can best be seen in FIG. 4, the drive shaft 58 is driven through means of a drive train including a driven gear 62 fixed to the forward end of the shaft 58 and meshed with a pinion 64 fixed to the rearward end of a countershaft 66. Fixed to the forward end of the countershaft 66 is a driven gear 68 which is meshed with an idler gear 70 which in turn is meshed with a pinion gear 72 fixed to a shaft 74 forming one of the output shafts of the range speed transmission section.

Also located in the rear housing portion 44 is a hydraulic fluid pump 76 including an annular housing 78 which is inserted through the rear end wall of the transmission housing portion 44 and has a flange 80 in which is received a plurality of bolts 82 which secure the housing in place. Extending axially into the housing is a pump drive shaft 84 having a driven gear 86 secured to its forward end, the gear being meshed with the pinion gear 64 of the countershaft 66. A rearward end 88 of the pump drive shaft 84 is adapted to be connected to the drive shaft of an auxiliary pump. The pump housing 78 includes a rear end cap 90 which may be removed to provide access to the rear end of the drive shaft 84. The pump 76 is located to the left side of the transmission housing with the drive shaft 84 being disposed at a level slightly higher than the level of the winch drive shaft 58. This disposition of the pump not only places the pump in a low position within the transmission but it also disposes the pump so that it is easily accessible from the hinge area of the vehicle so that the housing 78 may be removed rearwardly from the transmission back wall to permit the repair and/or servicing of the pump.

Figure 5:
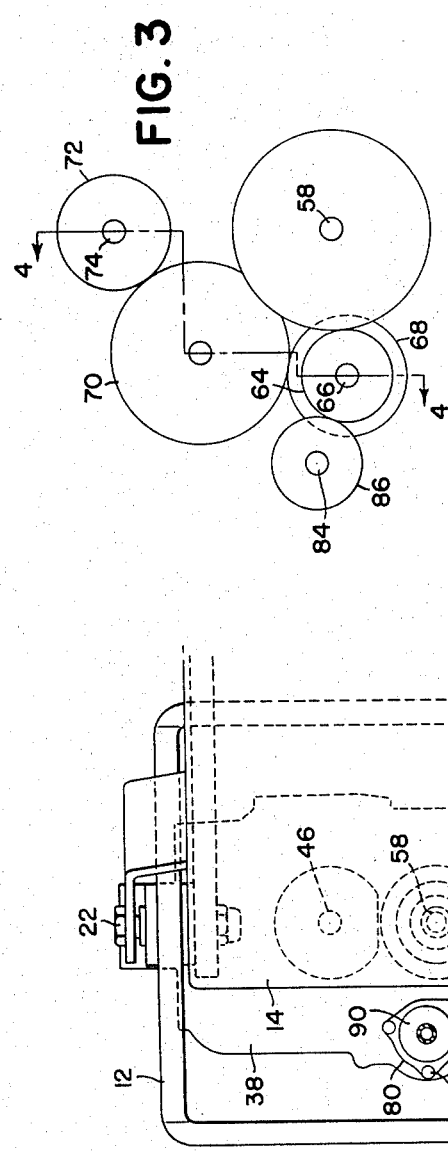

With reference to FIGS. 1 and 5, it will be appreciated that the traction wheel drive shaft 54 and the winch drive shaft 58 are positioned as low in the transmission as they can be and still meet the criteria of being on the tractor centerline, it being noted that the transmission itself is positioned as low as it can be and still provide adequate clearance beneath the tractor 10.

The operation of the transmission 28 is generally similar to that of the transmission disclosed in the aforementioned Harris et al patent to which reference may be had for a detailed description of the operation. Since it is thought that the advantages of the present invention are made apparent from the foregoing description, no further description of the operation is thought to be necessary.

I claim:

1. In an articulated tractor of the type including front and rear traction-wheel-supported frame sections pivotally interconnected by hinge joint means defining a vertical pivot axis located on the fore-and-aft centerline of the tractor, a transmission and a power shaft drivable auxiliary device being respectively mounted on the front and rear frame sections, the transmission comprising a fore-and-aft extending housing having a rear end terminating just forwardly of said axis and having located therein a range-speed section, an intermediate speed-change section and a rearward power output section; the latter section including vertically spaced traction wheel drive and auxiliary device drive shafts located on said centerline, and the traction wheel drive shaft being driven through a constant mesh gear train including a pinion gear mounted on an output shaft of the speed-change section, an idler gear and a driven gear mounted on the traction wheel drive shaft, the improvement comprising: said idler gear having an opening extending axially therethrough and said auxiliary device drive shaft extending axially through said idler gear opening.

2. The articulated tractor defined in claim 1 wherein said winch drive shaft is driven through a gear train including a pinion gear being mounted on an output shaft of the range-speed section and being meshed with an idler gear, the latter being in turn meshed with a driven gear mounted on a countershaft, a pinion gear being mounted on the last-named countershaft and meshed with a driven gear mounted on said winch drive shaft; and a pump located within the transmission housing and including a drive shaft having a driven gear mounted thereon and meshed with the last-named pinion gear.

3. The articulated tractor defined in claim 2 wherein the hinge joint means is of a type wherein a pair of vertically spaced pivot pins define the pivot axis; said auxiliary device drive shaft being located on a level approximately half-way between the pins and said pump including an annular housing extending through and being removably secured to the rear end of the housing at a location slightly above the level of the auxiliary device drive shaft and to one side the rear of the transmission housing rear end, whereby the pump housing is in an easily accessible position from the hinge area of the tractor when the front and rear frame sections are pivoted relative to each other to a position of fore-and-aft misalignment to permit the pump housing to be withdrawn from the transmission housing for servicing.

4. The articulated tractor defined in claim 3 wherein the pump housing includes an end cap removably secured over that end of the housing which projects through the transmission housing end wall and said pump drive shaft having an end adapted for connection to an auxiliary pump and being accessible for such connections by removal of the end cap.

5. In an articulated tractor of the type including front and rear traction-wheel-supported frame sections pivotally interconnected by hinge joint means defining a vertical pivot axis located on the fore-and-aft centerline of the tractor, a transmission housing and a winch respectively mounted on the front and rear frame sections, said transmission housing containing first and second drive shafts respectively for the traction wheels and winch and having rear ends supported by and projecting through the housing rear end at vertically spaced locations on the tractor centerline; said first drive shaft being driven through a gear train including a driven gear mounted on the first drive shaft, an idler gear meshed with the driven gear and a pinion gear meshed with the idler gear, the improvement comprising: said second drive shaft being loosely and coaxially received in said idler gear.

6. The articulated tractor defined in claim 5 and further including a pump located within the transmission housing and including a pump drive shaft extending parallel to the second drive shaft; said second drive shaft being driven through a gear train including a driven gear fixed to the second drive shaft and a pinion gear fixed to a countershaft and meshed with the drive gear; and said pump drive shaft having a driven gear fixed thereto and meshed with the last-mentioned pinion gear.

7. The articulated vehicle defined in claim 6 wherein the pump includes an annular housing having one end extending through and releasably secured to the rear end of the transmission housing.

8. The articulated vehicle defined in claim 6 wherein said pump housing is disposed such that the pump drive shaft is located slightly above the level of the second drive shaft and to one side of the transmission rear ends, whereby the pump is easily accessible for servicing from the hinge area of the tractor.

9. The articulated tractor defined in claim 8 wherein the pump housing includes an end cap removably secured over that end of the housing which projects through the transmission housing end wall and said pump drive shaft having an end adapted for connection to an auxiliary pump and being accessible for such connections by removal of the end cap.

10. In an articulated tractor of the type including front and rear frame sections hingedly interconnected by means defining a vertical pivot axis, a winch mounted centrally on the rear frame section, a transmission having fore-and-aft extending parallel shafts being mounted on the front frame section and including a forward range-speed section, an intermediate speed-change section and a rearward output section, said range-speed section including at least one output shaft constantly driven at engine speed and at least a second selectively engageable output shaft, the second output shaft being connected to the speed-change section, said one output shaft having a pinion gear fixed thereto; a first idler gear being meshed with said pinion gear, a countershaft carrying a first driven gear meshed with the first idler gear and further carrying a pinion gear, said output section including a winch drive shaft carrying a second driven gear meshed with said second pinion, said output section further including a traction wheel drive shaft carrying a driven gear, a second idler gear meshed with the driven gear and with a pinion gear carried by an output shaft of said speed-change section, and said winch drive and traction wheel drive shafts being vertically spaced and located on the tractor fore-and-aft extending centerline, the improvement comprising: said traction drive shaft extending axially through and being loosely received in said second idler gear.

* * * * *